US012692391B2

(12) United States Patent
Wakabayashi et al.

(10) Patent No.: US 12,692,391 B2
(45) Date of Patent: Jul. 28, 2026

(54) THERMOPLASTIC RESIN COMPOSITION FOR REFRIGERANT TRANSPORTATION HOSE AND REFRIGERANT TRANSPORTATION HOSE

(71) Applicant: The Yokohama Rubber Co., LTD., Kanagawa (JP)

(72) Inventors: Kenta Wakabayashi, Kanagawa (JP); Shusaku Tomoi, Kanagawa (JP); Shun Sato, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 523 days.

(21) Appl. No.: 18/547,905

(22) PCT Filed: Jan. 24, 2022

(86) PCT No.: PCT/JP2022/002446
§ 371 (c)(1),
(2) Date: Aug. 25, 2023

(87) PCT Pub. No.: WO2022/185779
PCT Pub. Date: Sep. 9, 2022

(65) Prior Publication Data
US 2024/0182712 A1      Jun. 6, 2024

(30) Foreign Application Priority Data
Mar. 1, 2021     (JP) ................................. 2021-031923

(51) Int. Cl.
| | |
|---|---|
| *C08L 77/06* | (2006.01) |
| *C08K 5/098* | (2006.01) |
| *C08K 5/18* | (2006.01) |
| *C08L 23/22* | (2025.01) |
| *C08L 23/283* | (2025.01) |
| *C08L 25/08* | (2006.01) |
| *F16L 11/04* | (2006.01) |

(52) U.S. Cl.
CPC .............. *C08L 77/06* (2013.01); *C08K 5/098* (2013.01); *C08K 5/18* (2013.01); *C08L 23/22* (2013.01); *C08L 23/283* (2013.01); *C08L 25/08* (2013.01); *F16L 11/04* (2013.01); *C08L 2203/18* (2013.01); *C08L 2205/025* (2013.01); *C08L 2205/03* (2013.01); *C08L 2205/22* (2013.01)

(58) Field of Classification Search
None
See application file for complete search history.

(56) References Cited

U.S. PATENT DOCUMENTS

2023/0055055 A1*   2/2023   Wakabayashi .......... F16L 11/08

FOREIGN PATENT DOCUMENTS

| | | |
|---|---|---|
| CN | 105175859 A | 12/2015 |
| CN | 106917921 A | 7/2017 |
| JP | 06-145425 A | 5/1994 |
| JP | 06-294485 A | 10/1994 |
| JP | H09-124848 A | 5/1997 |
| JP | 09-143366 A | 6/1997 |
| JP | 2007-327027 A | 12/2007 |
| JP | 2009-137195 A | 6/2009 |
| JP | 2014-095093 A | 5/2014 |
| JP | 2020-105284 A | 7/2020 |
| WO | 2021/019836 A1 | 2/2021 |
| WO | WO-2021153079 A1 * | 8/2021 .............. C08L 77/02 |

* cited by examiner

*Primary Examiner* — Christopher M Rodd
(74) *Attorney, Agent, or Firm* — Thorpe North & Western

(57) ABSTRACT

A thermoplastic resin composition for a refrigerant-transporting hose includes a thermoplastic resin and an elastomer. A 10% modulus M10 (MPa) at 25° C., a water vapor permeability coefficient $PC_{H2O}$ (g·mm/(m²·24 h) at a temperature of 60° C. and a relative humidity of 100%, a strength at break TB 150 (MPa) in a tensile test at 150° C., and an elongation at break $EB_{150}$ (%) in a tensile test at 150° C. satisfy Expressions (1), (2), and (3), namely $0.9 \leq M10 \times PC_{H2O} \leq 90$ . . . (1), $1.0 \leq TB_{150} \leq 20$ . . . (2), and $50 \leq EB_{150}$ . . . (3).

14 Claims, No Drawings

THERMOPLASTIC RESIN COMPOSITION FOR REFRIGERANT TRANSPORTATION HOSE AND REFRIGERANT TRANSPORTATION HOSE

TECHNICAL FIELD

The present technology relates to a thermoplastic resin composition for a refrigerant-transporting hose and to a refrigerant-transporting hose. The present technology particularly relates to a thermoplastic resin composition for a refrigerant-transporting hose outer layer consisting of a thermoplastic resin and an elastomer and to a refrigerant-transporting hose having an outer layer consisting of the thermoplastic resin composition.

BACKGROUND ART

With the increasing demand for weight reduction of automobiles, efforts have been made to achieve the weight reduction by manufacturing hoses made of rubber that have been used in automobiles with a resin having high barrier properties in place of rubber to reduce thickness. In particular, the refrigerant-transporting hose for current automobile air conditioners is composed mainly of rubber, and if the main material can be substituted with a resin having high barrier properties, a weight reduction can be achieved.

For example, Japan Unexamined Patent Publication No. 2009-137195 A discloses a refrigerant-transporting hose that uses a polyamide/polyether copolymer as a moisture-resistant and water-resistant barrier material.

In a refrigerant-transporting hose used in an air conditioner for an automobile or the like, permeation of water vapor from outside of the hose causes freezing of moisture inside the air conditioner, requiring a material with excellent water vapor barrier properties. However, the polyamide/polyether copolymer described in Japan Unexamined Patent Publication No. 2009-137195 A has insufficient flexibility and heat resistance.

SUMMARY

The present technology provides a water vapor barrier material that can achieve a balance between the flexibility, heat resistance, heat aging resistance, and water vapor barrier properties required for a refrigerant-transporting hose.

The present technology (I) is a thermoplastic resin composition for a refrigerant-transporting hose includes a thermoplastic resin and an elastomer. A 10% modulus M10 (MPa) at 25° C., a water vapor permeability coefficient $PC_{H2O}$ (g·mm/(m²·24 h) at a temperature of 60° C. and a relative humidity of 100%, a strength at break $TB_{150}$ (MPa) in a tensile test at 150° C., and an elongation at break $EB_{150}$ (%) in a tensile test at 150° C. satisfy Expressions (1), (2), and (3):

$$0.9 \le M10 \times PC_{H2O} \le 90 \tag{1}$$

$$1.0 \le TB_{150} \le 20 \tag{2}$$

$$50 \le EB_{150}. \tag{3}$$

The present technology (II) is a refrigerant-transporting hose including an inner layer, a reinforcing layer, and an outer layer, and the outer layer includes the thermoplastic resin composition of the present technology (I).

The present technology includes the following embodiments.

[1] A thermoplastic resin composition for a refrigerant-transporting hose includes a thermoplastic resin and an elastomer. A 10% modulus M10 (MPa) at 25° C., a water vapor permeability coefficient $PC_{H2O}$ (g·mm/(m²·24 h) at a temperature of 60° C. and a relative humidity of 100%, a strength at break TB 150 (MPa) in a tensile test at 150° C., and an elongation at break $EB_{150}$ (%) in a tensile test at 150° C. satisfy Expressions (1), (2), and (3):

$$0.9 \le M10 \times PC_{H2O} \le 90 \tag{1}$$

$$1.0 \le TB_{150} \le 20 \tag{2}$$

$$50 \le EB_{150}. \tag{3}$$

[2] The thermoplastic resin composition for a refrigerant-transporting hose according to [1], wherein an elongation at break in a tensile test at a temperature of 25° C. after being left standing at 150° C. for 168 hours is 50% or more.

[3] The thermoplastic resin composition for a refrigerant-transporting hose according to [1] or [2], wherein the thermoplastic resin composition has a sea-island structure consisting of a matrix containing a thermoplastic resin and a domain containing an elastomer, and a ratio of the elastomer in the thermoplastic resin composition is 50 mass % or more and less than 85 mass %.

[4] The thermoplastic resin composition for a refrigerant-transporting hose according to any one of [1] to [3], wherein a water vapor permeability coefficient $PC_{H2O}$ at a temperature of 60° C. and a relative humidity of 100% of the thermoplastic resin composition is 4.0 g mm/(m²·24 h) or less.

[5] The thermoplastic resin composition for a refrigerant-transporting hose according to any one of [1] to [4], wherein the thermoplastic resin is at least one selected from the group consisting of a polyamide resin, a polyester resin, and a vinyl alcohol resin.

[6] The thermoplastic resin composition for a refrigerant-transporting hose according to any one of [1] to [5], wherein the elastomer is at least one selected from the group consisting of a butyl rubber, a modified butyl rubber, an olefin thermoplastic elastomer, a styrene thermoplastic elastomer, a polyamide elastomer, and a polyester elastomer.

[7] The thermoplastic resin composition for a refrigerant-transporting hose according to any one of [1] to [6], wherein the thermoplastic resin composition includes at least one processing aid selected from the group consisting of a fatty acid, a fatty acid metal salt, a fatty acid ester, and a fatty acid amide.

[8] A refrigerant-transporting hose including an inner layer, a reinforcing layer, and an outer layer, the outer layer including a thermoplastic resin composition according to any one of [1] to [7].

The thermoplastic resin composition for a refrigerant-transporting hose according to an embodiment of the present technology exhibits an excellent balance between flexibility, heat resistance, heat aging resistance, and water vapor barrier properties.

The refrigerant-transporting hose according to an embodiment of the present technology exhibits an excellent balance between flexibility, heat resistance, heat aging resistance, and water vapor barrier properties.

DETAILED DESCRIPTION

The present technology (I) relates to a thermoplastic resin composition for a refrigerant-transporting hose.

The refrigerant-transporting hose is referred to as a hose for transporting a refrigerant for an air conditioner or the like. The thermoplastic resin composition according to an embodiment of the present technology is particularly suitably used for a hose for transporting a refrigerant for an air conditioner of an automobile. Examples of air conditioner refrigerants include hydrofluorocarbons (HFCs), hydrofluoroolefins (HFOs), hydrocarbons, carbon dioxide, ammonia, and water; examples of the HFCs include R410A, R32, R404A, R407C, R507A, and R134a; examples of the HFOs include R1234yf, R1234ze, 1233zd, R1123, R1224yd, and R1336mzz; and examples of the hydrocarbons include methane, ethane, propane, propylene, butane, isobutane, hexafluoropropane, and pentane.

The structure of the refrigerant-transporting hose is not limited to particular structures but typically consists of an inner layer, a reinforcing layer, and an outer layer. The thermoplastic resin composition according to an embodiment of the present technology is preferably used for a material for forming an outer layer of a refrigerant-transporting hose.

A 10% modulus (MPa) at 25° C. of the thermoplastic resin composition is denoted by M10, a water vapor permeability coefficient (g mm/(m²·24 h) at a temperature of 60° C. and a relative humidity of 100% of the thermoplastic resin composition is denoted by $PC_{H2O}$, and the thermoplastic resin composition satisfies Expression (1):

$$0.9 \leq M10 \times PC_{H2O} \leq 90, \tag{1}$$

preferably satisfies Expression (1')

$$0.9 \leq M10 \times PC_{H2O} \leq 45, \tag{1'}$$

and more preferably satisfies Expression (1")

$$5 \leq M10 \times PC_{H2O} \leq 45. \tag{1''}$$

The thermoplastic resin composition satisfying the above Expressions allows the wall thickness of the refrigerant-transporting hose to be reduced and the flexibility of the hose to also be improved.

A method for causing the thermoplastic resin composition to satisfy the above Expressions is to select a resin and a rubber having good water vapor barrier properties and blend 40 mass % or more of the rubber.

A strength at break (MPa) of the thermoplastic resin composition in a tensile test at 150° C. is denoted by $TB_{150}$, and the thermoplastic resin composition satisfies Expression (2):

$$1.0 \leq TB_{150} \leq 20, \tag{2}$$

preferably satisfies Expression (2')

$$2.0 \leq TB_{150} \leq 20, \tag{2'}$$

and more preferably satisfies Expression (2")

$$3.0 \leq TB_{150} \leq 20. \tag{2''}$$

The thermoplastic resin composition exhibits an advantage of improved heat resistance of the refrigerant-transporting hose by satisfying the above Expressions.

A method for causing the thermoplastic resin composition to satisfy the above Expressions is to use a resin having a high melting point.

An elongation at break (%) of the thermoplastic resin composition in a tensile test at 150° C. is denoted by $EB_{150}$, and the thermoplastic resin composition satisfies Expression (3):

$$50 \leq EB_{150}, \tag{3}$$

preferably satisfies Expression (3')

$$100 \leq EB_{150}, \tag{3'}$$

and more preferably satisfies Expression (3")

$$200 \leq EB_{150}. \tag{3''}$$

The thermoplastic resin composition exhibits an advantage of improved heat resistance of the refrigerant-transporting hose by satisfying the above Expressions.

A method for causing the thermoplastic resin composition to satisfy the above Expressions is to use a resin having a high melting point.

The thermoplastic resin composition includes a thermoplastic resin and an elastomer.

The thermoplastic resin composition preferably has a sea-island structure consisting of a matrix including a thermoplastic resin and a domain including an elastomer. The thermoplastic resin composition having a sea-island structure allows a material having good flexibility, water vapor barrier properties, and extrudability to be produced.

The thermoplastic resin constituting the thermoplastic resin composition is not limited as long as the effects of the present technology are exhibited but is preferably at least one selected from the group consisting of a polyamide resin, a polyester resin, and a vinyl alcohol resin.

Examples of the polyamide resin include polyamide 6, polyamide 66, polyamide 11, polyamide 12, polyamide 610, a polyamide 6/66 copolymer, a polyamide 6/12 copolymer, polyamide 46, polyamide 6T, polyamide 9T, and polyamide MXD6, and of these, polyamide 12 is preferable.

Examples of the polyester resin include polyethylene terephthalate, polybutylene terephthalate, polyethylene naphthalate, and polybutylene naphthalate, and of these, polybutylene terephthalate is preferable.

Examples of the vinyl alcohol resin include polyvinyl alcohol, ethylene-vinyl alcohol copolymers, and modified ethylene-vinyl alcohol copolymers, and of these, ethylene-vinyl alcohol copolymers are preferable.

The elastomer constituting the thermoplastic resin composition is not limited as long as the effect of the present technology is exhibited but is preferably at least one selected from the group consisting of a butyl rubber, a modified butyl rubber, an olefin thermoplastic elastomer, a styrene thermoplastic elastomer, a polyamide elastomer, and a polyester elastomer.

Examples of the butyl rubber include butyl rubber (IIR) and an isobutylene-p-methylstyrene copolymer.

Examples of the modified butyl rubber include halogenated butyl rubbers (chlorinated butyl rubber, brominated butyl rubber) and halogenated isobutylene-p-methylstyrene copolymer (chlorinated isobutylene-p-methylstyrene copolymer, brominated isobutylene-p-methylstyrene copolymer), and of these, the brominated isobutylene-p-methylstyrene copolymer (Br-IPMS) is preferable.

Examples of the olefin thermoplastic elastomer include ethylene-$\alpha$-olefin copolymers (such as an ethylene-propylene copolymer, an ethylene-butene copolymer, an ethylene-pentene copolymer, an ethylene-hexene copolymer, and an ethylene-octene copolymer), ethylene-ethyl acrylate copolymers, maleic anhydride-modified ethylene-$\alpha$-olefin copolymers, maleic anhydride-modified ethylene-ethyl acrylate copolymers, and ethylene-glycidyl methacrylate copolymers, and of these, maleic anhydride-modified ethylene-$\alpha$-olefin copolymers are preferable.

Examples of the styrene thermoplastic elastomer includes styrene-butadiene-styrene block copolymers (SBSs), styrene-isoprene-styrene block copolymers (SISs), styrene-ethylene/propylene-styrene copolymers (SEPSs), styrene-ethylene/butylene-styrene block copolymers (SEBSs), styrene-butadiene-styrene copolymers (SBSs), styrene-isobutylene-styrene block copolymers (SIBSs), and their maleic anhydride-modified products. Among them, a styrene-isobutylene-styrene block copolymer (SIBS) or a maleic anhydride-modified styrene-ethylene/butylene-styrene block copolymer is preferred.

The polyamide elastomer (TPA) is a thermoplastic elastomer having a hard segment that is a polyamide (for example, polyamide 6, polyamide 66, polyamide 11, or polyamide 12) and a soft segment that is a polyether (for example, polyethylene glycol or polypropylene glycol). Polyamide elastomers are commercially available, and a commercially available product can be used in embodiments of the present technology. Examples of the commercially available product of the polyamide elastomer include "UBESTA" (trade name) XPA series, available from Ube Industries, Ltd., and "PEBAX" (trade name), available from Arkema K.K.

The polyester elastomer (TPEE) is a thermoplastic elastomer having a hard segment of polyester (e.g., polybutylene terephthalate) and a soft segment of polyether (e.g., polytetramethylene glycol) or polyester (e.g., aliphatic polyester). Polyester elastomers are commercially available, and a commercially available product can be used in embodiments of the present technology. Examples of the commercially available product of the polyester elastomer include "PEL-PRENE" (trade name), available from Toy obo Co., Ltd., and "Hytrel" (trade name), available from Du Pont-Toray Co., Ltd.

The ratio of the elastomer in the thermoplastic resin composition is preferably 50 mass % or more and less than 85 mass %, more preferably 55 mass % or more and less than 85 mass %, and even more preferably 60 mass % or more and less than 85 mass %. If the ratio of elastomer is too low, the flexibility of the hose becomes insufficient. If the ratio of elastomer is too high, the extrudability of the hose degrades.

The ratio of the thermoplastic resin in the thermoplastic resin composition is preferably greater than 15 mass % and 50 mass % or less, more preferably greater than 15 mass % and 45 mass % or less, and even more preferably greater than 15 mass % and 40 mass % or less. If the ratio of the thermoplastic resin is too small, the extrudability of the hose degrades. If the ratio of thermoplastic resin is too high, the flexibility of the hose becomes insufficient.

The thermoplastic resin composition preferably includes a processing aid. Adding the processing aid can improve extrudability of the thermoplastic resin composition.

The processing aid is preferably at least one type selected from the group consisting of a fatty acid, a fatty acid metal salt, a fatty acid ester, and a fatty acid amide.

Examples of the fatty acid include stearic acid, palmitic acid, and oleic acid, and stearic acid is preferred.

Examples of the fatty acid metal salt include calcium stearate, magnesium stearate, zinc stearate, and barium stearate. Among them, calcium stearate and magnesium stearate are preferred.

Examples of the fatty acid ester include fatty acid esters obtained by esterification reaction of a higher fatty acid and a lower alcohol, a higher alcohol, or a polyhydric alcohol, the higher fatty acid being obtained by hydrolysis of coconut oil, castor oil, palm oil, beef tallow, or the like.

Examples of the fatty acid amide include stearylamide, palmitylamide, and oleylamide.

The content of the processing aid is not limited as long as the effects of the present technology are exhibited but is preferably from 1.0 to 5.0 mass %, more preferably from 1.0 to 3.0 mass %, and even more preferably from 1.0 to 2.0 mass %.

The thermoplastic resin composition can contain a crosslinking agent. Adding the crosslinking agent allows the elastomer to be crosslinked and 50 mass % or more of the elastomer to be blended.

The crosslinking agent is preferably a compound having a plurality of amino groups per molecule and is, among such compounds, preferably a diamine, such as N-phenyl-N'-(1, 3-dimethylbutyl)-p-phenylenediamine (6PPD), 3,3'-diaminodiphenylsulfone (3,3'-DAS), and 4,4'-diaminodiphenylsulfone (4,4'-DAS).

The added amount of the crosslinking agent is not limited as long as the effects of the present technology are exhibited but is preferably from 0 to 6 mass %, more preferably from 1 to 5 mass %, and even more preferably from 2 to 5 mass %.

The thermoplastic resin composition may contain additives other than the processing aid and the crosslinking agent. Examples of additives other than the processing aid and the crosslinking agent include an anti-heat aging agent and a color master batch.

The elongation at break of the thermoplastic resin composition in a tensile test at a temperature of 25° C. after being left standing at 150° C. for 168 hours is preferably 50% or more, more preferably 100% or more, and even more preferably 200% or more. The elongation at break in the tensile test at a temperature of 25° C. after being left standing at 150° C. for 168 hours is hereinafter referred to as an "elongation at break after heat aging". The elongation at break after heat aging of the thermoplastic resin composition falling within the above numerical range improves the heat aging resistance of a hose produced by using the thermoplastic resin composition. A method for causing the elongation at break after heat aging of the thermoplastic resin composition to fall within the above numerical range is using a resin with an anti-heat aging agent added or a resin having a high melting point.

The water vapor permeability coefficient $PC_{H2O}$ of the thermoplastic resin composition at a temperature of 60° C. and a relative humidity of 100% is preferably 4.0 g·mm/ (m²·24 h) or less, more preferably 3.8 g·mm/(m²·24 h) or less, and even more preferably 3.5 g·mm/(m²·24 h) or less. The water vapor permeability coefficient $PC_{H2O}$ falling within the above numerical range improves the water vapor barrier properties of a hose produced by using the thermoplastic resin composition. A method for causing the water vapor permeability coefficient $PC_{H2O}$ of the thermoplastic resin composition to fall within the above numerical range is to make the elastomer to be used a butyl rubber or a modified butyl rubber.

The method for manufacturing the thermoplastic resin composition is not limited to particular methods, and the thermoplastic resin composition can be manufactured by kneading the thermoplastic resin, the elastomer, and as necessary, an additive such as a processing aid and a crosslinking agent by using a twin screw extruder or the like.

An embodiment of the present technology (II) relates to a refrigerant-transporting hose.

The refrigerant-transporting hose according to an embodiment of the present technology (II) includes an inner layer, a reinforcing layer, and an outer layer, and the outer layer may include the thermoplastic resin composition according to an embodiment of the present technology (I).

The refrigerant-transporting hose according to an embodiment of the present technology (II) includes the thermoplastic resin composition according to an embodiment of the present technology (I) and thus can achieve a balance between flexibility, heat resistance, heat aging resistance, and water vapor barrier properties.

The inner layer, which is not limited, is a layer consisting of a thermoplastic resin composition, a thermoplastic elastomer composition, rubber, or the like.

The reinforcing layer, which is not limited, is, for example, a layer of braided fibers.

The method for manufacturing the refrigerant-transporting hose is not limited to particular methods, and the refrigerant-transporting hose can be manufactured by, for example, first extruding the inner layer into a tube shape by extrusion molding, then braiding fibers serving as a reinforcing layer onto the tube, and further covering the fibers with an outer layer by extrusion molding.

The refrigerant-transporting hose according to an embodiment of the present technology (II) can be used as a hose for transporting a refrigerant of an air conditioner or the like and is particularly suitably used as a hose for transporting a refrigerant for an air conditioner of an automobile.

EXAMPLES

Raw Materials

The raw materials used in the following examples and comparative examples are as follows.

Thermoplastic Resin

PA6: a polyamide 6 "UBE Nylon" 1011FB available from Ube Industries, Ltd.

PA6/12: a polyamide 6/12 copolymer "UBE Nylon" 7024B available from Ube Industries, Ltd.

PA12: a polyamide 12 "UBESTA" (trade name) 3012U available from Ube Industries, Ltd.

EVOH: an ethylene-vinyl alcohol copolymer (ethylene content: 48%) "Soarnol" (trade name) H4815 available from Mitsubishi Chemical Corporation PBT: a polybutylene terephthalate "Novaduran" (trade name) 5010R available from Mitsubishi Engineering-Plastics Corporation Elastomer Br-IPMS: a brominated isobutylene-p-methylstyrene copolymer "EXXPRO" (trade name) 3745 available from ExxonMobil Chemical Company SIBS: a styrene-isobutylene-styrene block copolymer "SIBSTAR" (trade name) 102T available from Kaneka Corporation Mah-EB: a maleic acid-modified ethylene-1-butene copolymer "Tafmer" (trade name) MH7020 available from Mitsui Chemicals, Inc.

TPA: a thermoplastic poly amide elastomer "UBESTA" (trade name) XPA 9063X1 available from Ube Industries, Ltd.

TPEE: a thermoplastic polyester elastomer "Palprene" (trade name) S-3001 available from Toyobo Co. Ltd.

Processing Aid

St-Ca: a calcium stearate "SC-PG" available from Sakai Chemical Industry Co., Ltd.

St-Mg: a magnesium stearate "SM-PG" available from Sakai Chemical Industry Co., Ltd.

Crosslinking Agent

6PPD: N-phenyl-N'-(1,3-dimethylbutyl)-p-phenylenediamine "SANTOFLEX" (trade name) 6PPD available from Solutia Inc.

Examples 1 to 10

A thermoplastic resin, an elastomer, a processing aid, and a crosslinking agent were inserted into a twin screw extruder (available from The Japan Steel Works, Ltd.) at the compounding ratios shown in Tables 1 and 2 and kneaded for 3 minutes at 235° C. The kneaded product was extruded continuously in a strand-like form from the extruder, cooled with water, and then cut with a cutter to obtain a pellet-shaped thermoplastic resin composition.

For each of the obtained thermoplastic resin compositions, the 10% modulus M10, the water vapor permeability coefficient $PC_{H2O}$, the strength at break $TB_{150}$, the elongation at break $EB_{150}$, and the elongation at break after heat aging were measured to evaluate the extrudability. The measurement and evaluation results are shown in Tables 1 and 2.

Comparative Examples 1 to 4

A thermoplastic polyester elastomer "Hytrel" (trade name) 4057N available from Du Pont-Toray Co., Ltd. was selected as Comparative Example 1, a thermoplastic polyester elastomer "Hytrel" (trade name) 3001 available from Du Pont-Toray Co., Ltd. was selected as Comparative Example 2, an acrylic elastomer "Trisect" (trade name) XB-A60 available from Aronkasei Co., Ltd. was selected as Comparative Example 3, and a nylon resin "ZYTEL" (trade name) ST811HS available from DuPont was selected as Comparative Example 4. For these comparative examples, the 10% modulus M10, water vapor permeability coefficient $PC_{H2O}$, strength at break $TB_{150}$, elongation at break $EB_{150}$, and elongation at break after heat aging were measured to evaluate the extrudability. The measurement and evaluation results are shown in Tables 1 and 2.

The measurement and evaluation methods for each of the measurement and evaluation items were as follows.

Measurement of Water Vapor Permeability Coefficient

A sample of the thermoplastic resin composition was formed into a sheet with an average thickness of 0.2 mm by using a 40 mm 0 single screw extruder (available from Pla Giken Co., Ltd.) equipped with a 200-mm wide T-shaped die and setting the temperatures of the cylinder and the die at 10° C. plus the melting point of the polymer component having the highest melting point in the sample composition at a cooling roll temperature of 50° C. and a take-up speed of 3 m/min.

The obtained sheet was cut out, and the water vapor permeability coefficient was measured at a temperature of 60° C. and a relative humidity of 100% by using a water vapor permeation tester available from GTR Tec Corporation.

Measurement of 10% Modulus M10

A sheet having an average thickness of 0.2 mm and manufactured to measure the water vapor permeability coefficient was punched into a JIS (Japanese Industrial Standard) No. 3 dumbbell shape and then subjected to a tensile test at a temperature of 25° C., a relative humidity of 50%, and a speed of 500 mm/min in accordance with JIS K7161. A stress at 10% elongation (10% modulus) was determined from the resulting stress-strain curve.

The elongation when the sheet was broken (elongation at break) was determined from the obtained stress-strain curve.

Measurement of Elongation at Break after Heat Aging

A sheet having an average thickness of 0.2 mm and manufactured to measure the water vapor permeability coefficient was left standing in an oven set at 150° C. in an air atmosphere for 168 hours and thereby subjected to a heat aging treatment. After the heat aging treatment, the sheet was punched into a JIS No. 3 dumbbell shape, and subjected to a tensile test in accordance with JIS K7161 at a temperature of 25° C., a relative humidity of 50%, and a speed of 500 mm/min. The elongation when the sheet was broken (elongation at break) was determined from the obtained stress-strain curve.

Evaluation of Extrudability

Each sample of the thermoplastic resin composition was extruded at 235° C. by using a T-die sheet forming device (available from Tomi Machinery Co., Ltd.), drawn onto a cooling roll made of metal, pulled by a pinch roll, and then wound by a winding machine, and thereby films of the thermoplastic resin composition were manufactured. The films were all made to have a thickness of 200 μm and evaluated as "o" (i.e., good) when the films were able to be molded without any problems, as "Δ" (i.e., partially good or of middling quality) when minor grains, hole formation, or cuts in the sheet end portions occurred, and as "x" (i.e., poor) when major grains, hole formation, or cuts in the sheet end portions occurred.

TABLE 1-1

| | | | Example 1 | Example 2 | Example 3 | Example 4 |
|---|---|---|---|---|---|---|
| Thermoplastic resin | PA6 | Parts by mass | 26 | 28 | | |
| | PA6/12 | Parts by mass | 10 | 10 | | |
| | PA12 | Parts by mass | | | 36 | 49 |
| | EVOH | Parts by mass | | | | |
| | PBT | Parts by mass | | | | |
| Elastomer | Br-IPMS | Parts by mass | 60 | 60 | 60 | 47 |
| | SIBS | Parts by mass | | | | |
| | Mah-EB | Parts by mass | | | | |
| | TPA | Parts by mass | | | | |
| | TPEE | Parts by mass | | | | |
| Processing aid | St-Ca | Parts by mass | 2 | | 2 | 2 |
| | St-Mg | Parts by mass | | | | |
| Crosslinking agent | 6PPD | Parts by mass | 2 | 2 | 2 | 2 |
| 10% modulus M10 | | MPa | 5.6 | 5.7 | 5.9 | 11.0 |
| Water vapor permeability coefficient $PC_{H2O}$ | | *1) | 3.7 | 3.7 | 2.3 | 3.6 |
| $M10 \times PC_{H2O}$ | | | 20.7 | 21.2 | 13.6 | 39.6 |
| Strength at break $TB_{150}$ | | MPa | 7.5 | 7.2 | 5.2 | 4.4 |
| Elongation at break $EB_{150}$ | | % | 293 | 286 | 379 | 251 |
| Elongation at break after heat aging | | % | 209 | 198 | 261 | 154 |
| Extrudability | | | o | Δ | o | o |

*1) Unit of water vapor permeability coefficient $PC_{H2O}$: g · mm/(m$^2$ · 24 h)

Measurement of Strength at Break $TB_{150}$

A sheet having an average thickness of 0.2 mm and manufactured to measure the water vapor permeability coefficient was punched into a JIS No. 3 dumbbell shape and then subjected to a tensile test at a temperature of 150° C. and a speed of 500 mm/min in accordance with JIS K7161. The stress when the sheet was broken (strength at break) was determined from the obtained stress-strain curve.

Measurement of Elongation at Break $EB_{150}$

A sheet having an average thickness of 0.2 mm and manufactured to measure the water vapor permeability coefficient was punched into a JIS No. 3 dumbbell shape and then subjected to a tensile test at a temperature of 150° C. and a speed of 500 mm/min in accordance with JIS K7161.

TABLE 1-2

| | | | Example 5 | Example 6 | Example 7 |
|---|---|---|---|---|---|
| Thermoplastic resin | PA6 | Parts by mass | | | |
| | PA6/12 | Parts by mass | | | |
| | PA12 | Parts by mass | | | |
| | EVOH | Parts by mass | 38 | 40 | 38 |
| | PBT | Parts by mass | | | |

TABLE 1-2-continued

| | | | Example 5 | Example 6 | Example 7 |
|---|---|---|---|---|---|
| Elastomer | Br-IPMS | Parts by mass | | | |
| | SIBS | Parts by mass | | | 60 |
| | Mah-EB | Parts by mass | 60 | 60 | |
| | TPA | Parts by mass | | | |
| | TPEE | Parts by mass | | | |
| Processing aid | St-Ca | Parts by mass | | | |
| | St-Mg | Parts by mass | 2 | | 2 |
| Crosslinking agent | 6PPD | Parts by mass | | | |
| 10% modulus M10 | | MPa | 9.0 | 9.0 | 8.0 |
| Water vapor permeability coefficient $PC_{H2O}$ | | *1) | 4.5 | 4.6 | 2.6 |
| M10 × $PC_{H2O}$ | | | 40.5 | 41.2 | 20.8 |
| Strength at break $TB_{150}$ | | MPa | 1.20 | 1.10 | 1.10 |
| Elongation at break $EB_{150}$ | | % | 115 | 123 | 105 |
| Elongation at break after heat aging | | % | 50 | 32 | 21 |
| Extrudability | | | ○ | Δ | ○ |

*1) Unit of water vapor permeability coefficient $PC_{H2O}$: g · mm/(m² · 24 h)

TABLE 2-1-continued

| | | | Example 8 | Example 9 | Example 10 |
|---|---|---|---|---|---|
| | PA12 | Parts by mass | | | |
| | EVOH | Parts by mass | | 20 | 36 |
| | PBT | Parts by mass | 40 | | |
| Elastomer | Br-IPMS | Parts by mass | | | |
| | SIBS | Parts by mass | | | |
| | Mah-EB | Parts by mass | 60 | 58 | 58 |
| | TPA | Parts by mass | | | 4 |
| | TPEE | Parts by mass | | 20 | |
| Processing aid | St-Ca | Parts by mass | | | |
| | St-Mg | Parts by mass | | 2 | 2 |
| Crosslinking agent | 6PPD | Parts by mass | | | |
| 10% modulus M10 | | MPa | 11.5 | 8.0 | 10.7 |
| Water vapor permeability coefficient $PC_{H2O}$ | | *1) | 4.6 | 9.0 | 4.9 |
| M10 × $PC_{H2O}$ | | | 52.9 | 72.0 | 52.5 |
| Strength at break $TB_{150}$ | | MPa | 1.20 | 1.10 | 1.40 |
| Elongation at break $EB_{150}$ | | % | 120 | 111 | 116 |
| Elongation at break after heat aging | | % | 56 | 63 | 55 |
| Extrudability | | | ○ | ○ | ○ |

*1) Unit of water vapor permeability coefficient PCH2O: g · mm/(m² · 24 h)

TABLE 2-2

| | | | Comparative Example 1 | Comparative Example 2 | Comparative Example 3 | Comparative Example 4 |
|---|---|---|---|---|---|---|
| Thermoplastic resin | PA6 | Parts by mass | Hytrel ® 4057N | Hytrel ® 3001 | Trisect ® XB-A60 | Zytel ® ST811HS |
| | PA6/12 | Parts by mass | | | | |
| | PA12 | Parts by mass | | | | |
| | EVOH | Parts by mass | | | | |
| | PBT | Parts by mass | | | | |
| Elastomer | Br-IPMS | Parts by mass | | | | |
| | SIBS | Parts by mass | | | | |
| | Mah-EB | Parts by mass | | | | |
| | TPA | Parts by mass | | | | |
| | TPEE | Parts by mass | | | | |
| Processing aid | St-Ca | Parts by mass | | | | |
| | St-Mg | Parts by mass | | | | |
| Crosslinking agent | 6PPD | Parts by mass | | | | |
| 10% modulus M10 | | MPa | 3.9 | 2.4 | 0.4 | 14.8 |
| Water vapor permeability coefficient $PC_{H2O}$ | | *1) | 24.1 | 27.3 | 35.4 | 8.9 |
| M10 × $PC_{H2O}$ | | | 94.0 | 65.5 | 14.2 | 131.7 |
| Strength at break $TB_{150}$ | | MPa | 1.0 | 0.6 | 0.1 | 20.0 |
| Elongation at break $EB_{150}$ | | % | 230 | 50 | 122 | 120 |
| Elongation at break after heat aging | | % | 66 | 219 | 200 | 60 |
| Extrudability | | | ○ | ○ | ○ | ○ |

*1) Unit of water vapor permeability coefficient $PC_{H2O}$: g · mm/(m² · 24 h)

TABLE 2-1

| | | | Example 8 | Example 9 | Example 10 |
|---|---|---|---|---|---|
| Thermoplastic resin | PA6 | Parts by mass | | | |
| | PA6/12 | Parts by mass | | | |

The thermoplastic resin composition for a refrigerant-transporting hose according to an embodiment of the present technology can be suitably used as a material for forming an outer layer of a refrigerant-transporting hose.

The refrigerant-transporting hose according to an embodiment of the present technology can be suitably used as a hose for transporting a refrigerant for an air conditioner of an automobile and the like.

The invention claimed is:

1. A thermoplastic resin composition for a refrigerant-transporting hose, the thermoplastic resin composition comprising:

a thermoplastic resin; and an elastomer;

a 10% modulus M10 (MPa) at 25° C., a water vapor permeability coefficient $PC_{H2O}$ (g·mm/(m$^2$·24 h) at a temperature of 60° C. and a relative humidity of 100%, a strength at break $TB_{150}$ (MPa) in a tensile test at 150° C., and an elongation at break $EB_{150}$(%) in a tensile test at 150° C. satisfying Expressions (1), (2), and (3):

$$0.9 \leq M10 \times PC_{H2O} \leq 90 \qquad (1)$$

$$1.0 \leq TB_{150} \leq 20 \qquad (2)$$

$$50 \leq EB_{150} \qquad (3).$$

2. The thermoplastic resin composition for a refrigerant-transporting hose according to claim 1, wherein an elongation at break in a tensile test at a temperature of 25° C. after being left standing at 150° C. for 168 hours is 50% or more.

3. The thermoplastic resin composition for a refrigerant-transporting hose according to claim 1, wherein the thermoplastic resin composition has a sea-island structure consisting of a matrix containing a thermoplastic resin and a domain containing an elastomer, and a ratio of the elastomer in the thermoplastic resin composition is 50 mass % or more and less than 85 mass %.

4. The thermoplastic resin composition for a refrigerant-transporting hose according to claim 1, wherein a water vapor permeability coefficient $PC_{H2O}$ at a temperature of 60° C. and a relative humidity of 100% of the thermoplastic resin composition is 4.0 g·mm/(m$^2$·24 h) or less.

5. The thermoplastic resin composition for a refrigerant-transporting hose according to claim 1, wherein the thermoplastic resin is at least one selected from the group consisting of a polyamide resin, a polyester resin, and a vinyl alcohol resin.

6. The thermoplastic resin composition for a refrigerant-transporting hose according to claim 1, wherein the elastomer is at least one selected from the group consisting of a butyl rubber, a modified butyl rubber, an olefin thermoplastic elastomer, a styrene thermoplastic elastomer, a polyamide elastomer, and a polyester elastomer.

7. The thermoplastic resin composition for a refrigerant-transporting hose according to claim 1, wherein the thermoplastic resin composition comprises at least one processing aid selected from the group consisting of a fatty acid, a fatty acid metal salt, a fatty acid ester, and a fatty acid amide.

8. A refrigerant-transporting hose, comprising:

an inner layer;

a reinforcing layer; and an outer layer;

the outer layer comprising a thermoplastic resin composition according to claim 1.

9. The thermoplastic resin composition for a refrigerant-transporting hose according to claim 2, wherein the thermoplastic resin composition has a sea-island structure consisting of a matrix containing a thermoplastic resin and a domain containing an elastomer, and a ratio of the elastomer in the thermoplastic resin composition is 50 mass % or more and less than 85 mass %.

10. The thermoplastic resin composition for a refrigerant-transporting hose according to claim 9, wherein a water vapor permeability coefficient $PC_{H2O}$ at a temperature of 60° C. and a relative humidity of 100% of the thermoplastic resin composition is 4.0 g·mm/(m$^2$·24 h) or less.

11. The thermoplastic resin composition for a refrigerant-transporting hose according to claim 10, wherein the thermoplastic resin is at least one selected from the group consisting of a polyamide resin, a polyester resin, and a vinyl alcohol resin.

12. The thermoplastic resin composition for a refrigerant-transporting hose according to claim 11, wherein the elastomer is at least one selected from the group consisting of a butyl rubber, a modified butyl rubber, an olefin thermoplastic elastomer, a styrene thermoplastic elastomer, a polyamide elastomer, and a polyester elastomer.

13. The thermoplastic resin composition for a refrigerant-transporting hose according to claim 12, wherein the thermoplastic resin composition comprises at least one processing aid selected from the group consisting of a fatty acid, a fatty acid metal salt, a fatty acid ester, and a fatty acid amide.

14. A refrigerant-transporting hose, comprising:

an inner layer;

a reinforcing layer; and an outer layer;

the outer layer comprising a thermoplastic resin composition according to claim 12.

* * * * *